United States Patent [19]

Yoshiyuki et al.

[11] Patent Number: 4,581,572

[45] Date of Patent: Apr. 8, 1986

[54] ALTERNATING CURRENT GENERATOR FOR A CAR

[75] Inventors: Iwaki Yoshiyuki; Matsumoto Akio; Yokota Mitsuyoshi, all of Himeji, Japan

[73] Assignee: Mitsubishi Denki Kabushiki Kaisha, Tokyo, Japan

[21] Appl. No.: 576,388

[22] PCT Filed: Jun. 1, 1983

[86] PCT No.: PCT/JP83/00176

§ 371 Date: Jan. 27, 1984

§ 102(e) Date: Jan. 27, 1984

[30] Foreign Application Priority Data

| Jun. 2, 1982 | [JP] | Japan | 57-83082[U] |
| Jun. 2, 1982 | [JP] | Japan | 57-83083[U] |
| Jun. 2, 1982 | [JP] | Japan | 57-83084[U] |
| Oct. 20, 1982 | [JP] | Japan | 57-159875[U] |

[51] Int. Cl.⁴ .................... H02J 7/14; H02P 9/10
[52] U.S. Cl. ...................... 322/86; 320/61; 320/67; 322/2 R; 322/60
[58] Field of Search ............ 322/28, 59, 60, 86-88; 320/61, 56, 64, 67, 68

[56] References Cited

U.S. PATENT DOCUMENTS

| 1,118,269 | 11/1914 | Creveling | 320/61 X |
| 3,086,161 | 4/1963 | Decarbo et al. | 320/67 X |
| 3,246,232 | 4/1966 | Langston et al. | 322/60 |
| 3,444,946 | 5/1969 | Waterbury | 320/56 |
| 3,559,027 | 1/1971 | Arsem | 320/61 |
| 4,301,376 | 11/1981 | Ragaly | 322/88 X |

FOREIGN PATENT DOCUMENTS 1329552 9/1973 United Kingdom ............... 320/56

Primary Examiner—R. J. Hickey
Attorney, Agent, or Firm—Oblon, Fisher, Spivak, McClelland & Maier

[57] ABSTRACT

Excitation of a field coil 2 is carried out by a separated power source 9 placed independent of a battery 8 to increase the output of a generator. A solar battery 10, a piezoelectric element 13 or a thermoelectric converting element 19 is used as the separately exciting means so that the output of the generator is increased for an exciting current effected by the separately exciting means.

9 Claims, 6 Drawing Figures

ALTERNATING CURRENT GENERATOR FOR A CAR

CROSS REFERENCE TO OTHER APPLICATIONS

Reference is made to co-pending applications of the same inventors as the present application, namely Ser. Nos. 576,387 and 576,390.

FIELD OF TECHNOLOGY

The present invention relates to an alternating current generator for a car for charging a battery.

BACKGROUND OF TECHNOLOGY

FIG. 1 is a circuit diagram showing an embodiment of the conventional alternating current generator for a car. In the figure, the reference nuemral 1 designates an armature coil having a three phase connection for generating an alternating current output and the numeral 2 designates a field coil, these parts constituting a three phase alternating current generator. The reference numeral 3 designates a main rectifying device for rectifying the alternating current output of the armature coil 1; the numeral 4 designates an auxiliary rectifying device for rectifying the alternating current output of the armature coil 1; the numeral 5 designates a voltage controlling device which turns on and off an exciting current passing to the field coil 2; the numeral 6 designates a key-switch; the numeral 7 designates a charge lamp connected to the key-switch 6 in series; and the numeral 8 designates a battery.

The positive side of the battery 8 charged by the output of the main rectifying device 3 is connected to the voltage controlling device 5 through a serial connection of the key-switch 6, a charge lamp 7 and the field coil 2. The output of the auxiliary rectifying device 4 is, on one hand, connected to the voltage controlling device 5 and is, on the other hand, connected to the voltage controlling device 5 through the field coil 2.

The operation of the circuit constructed as above-mentioned will be described.

First of all, when the key-switch 6 is closed, an exciting current is passed to the field coil 2 through a circuit of the positive (+) side of battery 8—key-switch 6—charge lamp 7—field coil 2—voltage controlling device 5—negative (−) side of battery 8. After this, when an engine is actuated for revolution whereby the terminal voltage of the generator increases, an exciting current is supplied from the auxiliary rectifying device 4 to the field coil 2 and the generator starts to generate power as a self-excited generator.

In such alternating current generator constructed as above-mentioned, however, a part of an output current is consumed as an exciting current to cause reduction in output from the exciting current corresponding to about ten percent of the output current of the generator and to cause consumption of excessive power of the engine disadvantageously.

SUMMARY OF THE INVENTION

In the present invention, an exciting current is supplied from a power soure other than a battery so as to constitute a generator as a separately excited generator whereby for instance, ten percent increase of an output current can be obtained even though the size of the generator is the same as the conventional one.

In the present invention, a generator is miniaturized and efficiency of the generator is improved by feeding an exciting current for a field coil from a solar battery which does not require power of an engine.

Further, in the present invention, an exciting current for a field coil is obtained by a piezoelectric element for converting vibration of an engine into electrical power so that the vibration of the engine is effectively utilized to improve efficiency of a generator.

The present invention is further advantageous from the view that efficiency of a generator can be advantageously improved by utilizing waste heat discharged from an engine in effective manner, without using any power of the engine, by providing an exciting means in which excitation of a field coil is carried out by a power source for separate excitation which performs heat-electricity conversion of the waste heat discharged from the engine so that a generator is used as a separately excited generator.

PREFERRED EMBODIMENT OF THE PRESENT INVENTION

Figure 1:
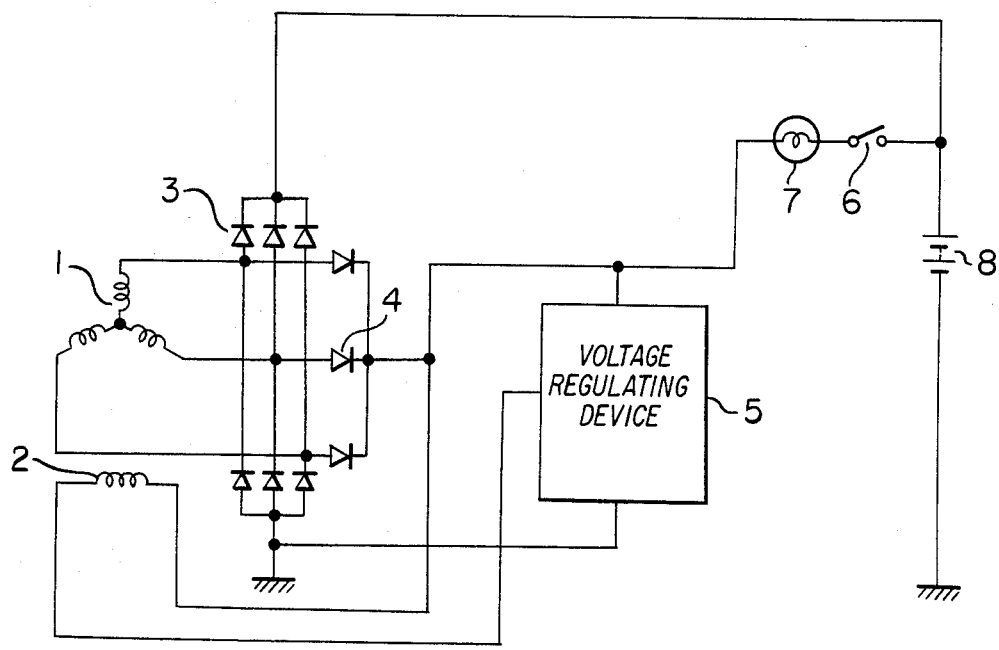
FIG. 1 is a circuit diagram of the conventional alternating current generator for a car.
Figure 2:
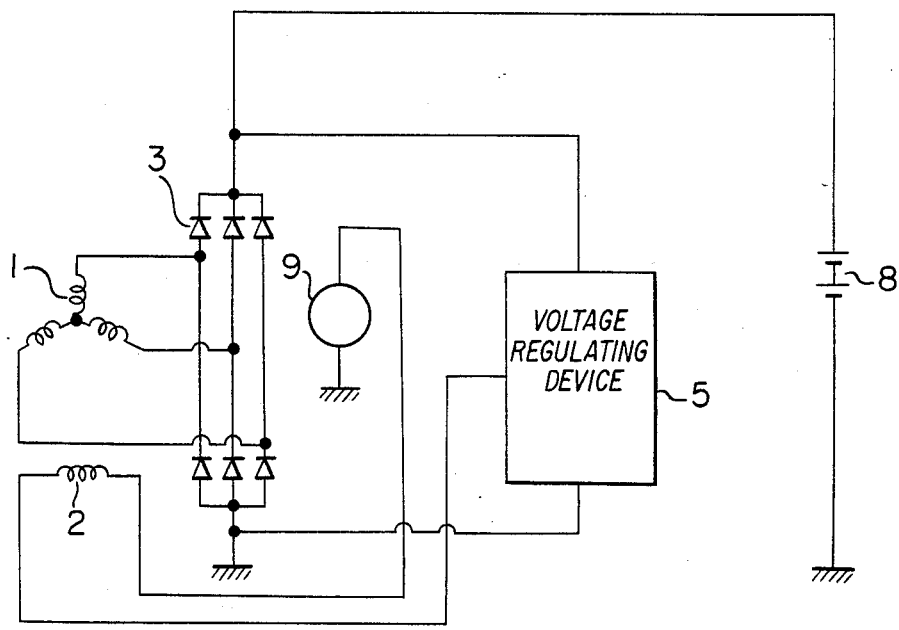
FIG. 2 is a circuit diagram of an embodiment of the alternating current generator for a car according to the present invention.

FIG. 2 is a circuit diagram showing an embodiment of the present invention.

In FIG. 2, the reference numeral 9 designates a power source other than the battery 8. The power source can be a second battery or a second generator and so on and one end of the power source is connected to the field coil 2 and the other end is grounded.

In the embodiment described above, when an engine is started, a generator initiates generation of power since an exciting current passes through the circuit of the power source 9—field coil 2—voltage controlling device 5—power source 9. Since the generator above-mentioned is so constructed that the exciting current is supplied from the power source 9 other than the battery to act as a separately excited generator, power generation is started earlier than that of the conventional generator for a time corresponding to the exciting current and an output current also increases for the exciting current.

Figure 4:
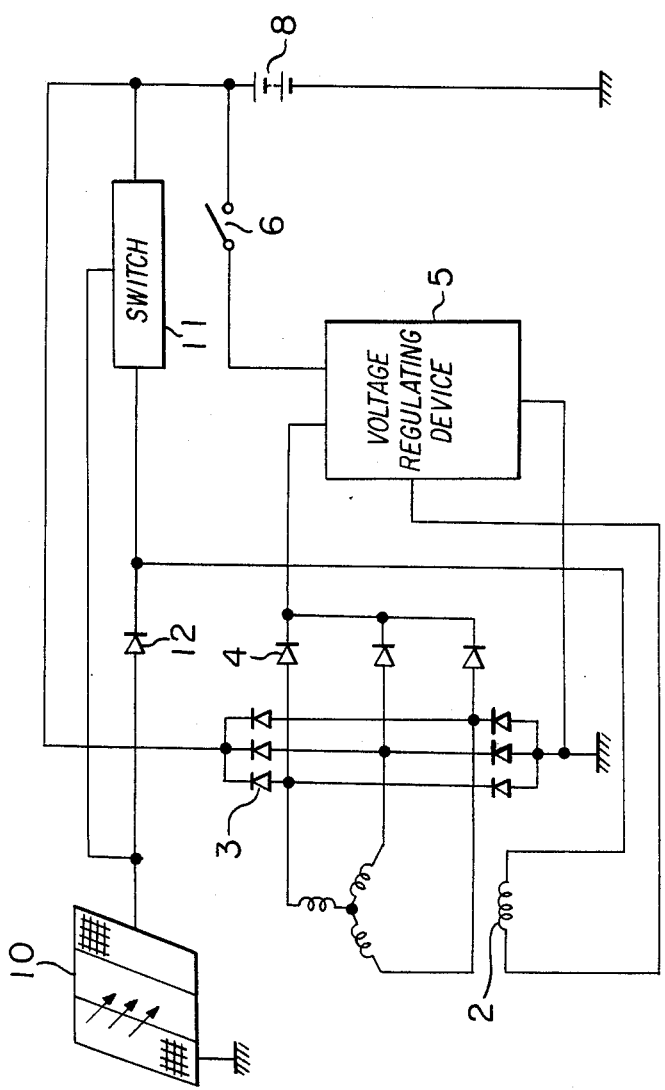
FIG. 4 is a circuit diagram of another embodiment of the alternating current generator according to the present invention.

FIG. 4 shows another embodiment of the present invention.

The reference numeral 10 designates an array of solar batteries; 11 designates a switch to detect a voltage produced in the solar battery array 10 to perform opening and closing operations; and 12 designates a reverse current blocking diode connected in the forward direction between the solar battery array 10 and the switch 11.

The junction of the switch 11 and the diode 12 is connected to the voltage controlling device 5 through the field coil 2 and the positive side of the battery 8 whose negative side is grounded is connected to the switch 11 and is also connected to the voltage controlling device 5 through the key-switch 6.

The operation of the embodiment shown in FIG. 4 will be described. In case that a voltage produced by the solar battery array 10 is above a previously determined value, the switch 11 is opened whereby an exciting current is passed to the field coil 2 through the circuit of the solar battery array 10—diode 12—field coil 2—voltage controlling device 5—solar battery array 10. Then, when an engine is driven with the exciting current passing, the generator starts to generate power as a separately excited generator.

Figure 3:
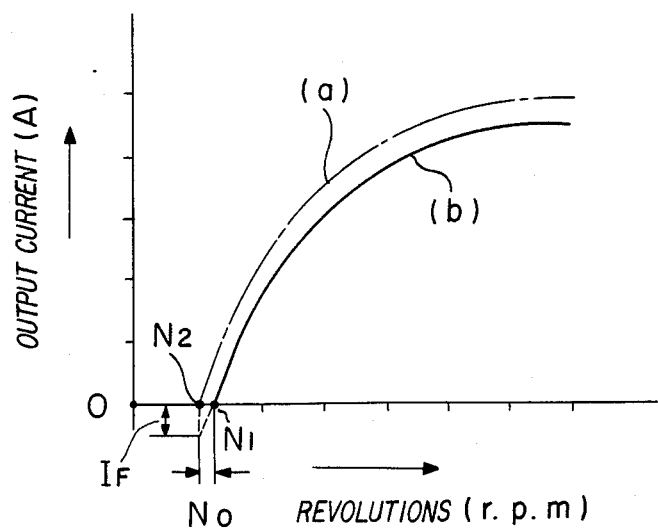
FIG. 3 is a characteristic diagram showing effect of the present invention in comparison with the conventional generator.

Thus, the exciting current is supplied to the field coil 2 from the solar battery array 10 and accordingly, as shown in the characteristic comparison diagram of FIG. 3 in which the abscissa denotes revolution (rpm) and the ordinate denotes output current A, the revolution at the time of starting generation of power in the characteristic curve (a) of the generator of the present invention is lowered by $No(=N_1-N_2)$rpm in comparison with the characteristic curve (b) of the conventional generator and the output current is increased for an amount of the field current IF.

In case that sunshine is insufficient as in the condition of night, rainy weather and so on, there is formed a auxiliary circuit in such a manner that an exciting current flows in the field coil 2 through the circuit having a higher potential of the positive side of battery 8—which 11—field coil 2—voltage controlling device 5—the negative side of battery 8.

In accordance with the embodiment as above-mentioned, an exciting current for a field coil is supplied from a solar battery requiring no power from an engine with the consequence that there is attainable a remarkable effect such that much output current is obtained in comparison with the conventional generator having the same size, hence substantial reduction in size of the generator is achieved and efficiency of the generator is also improved.

Figure 5:
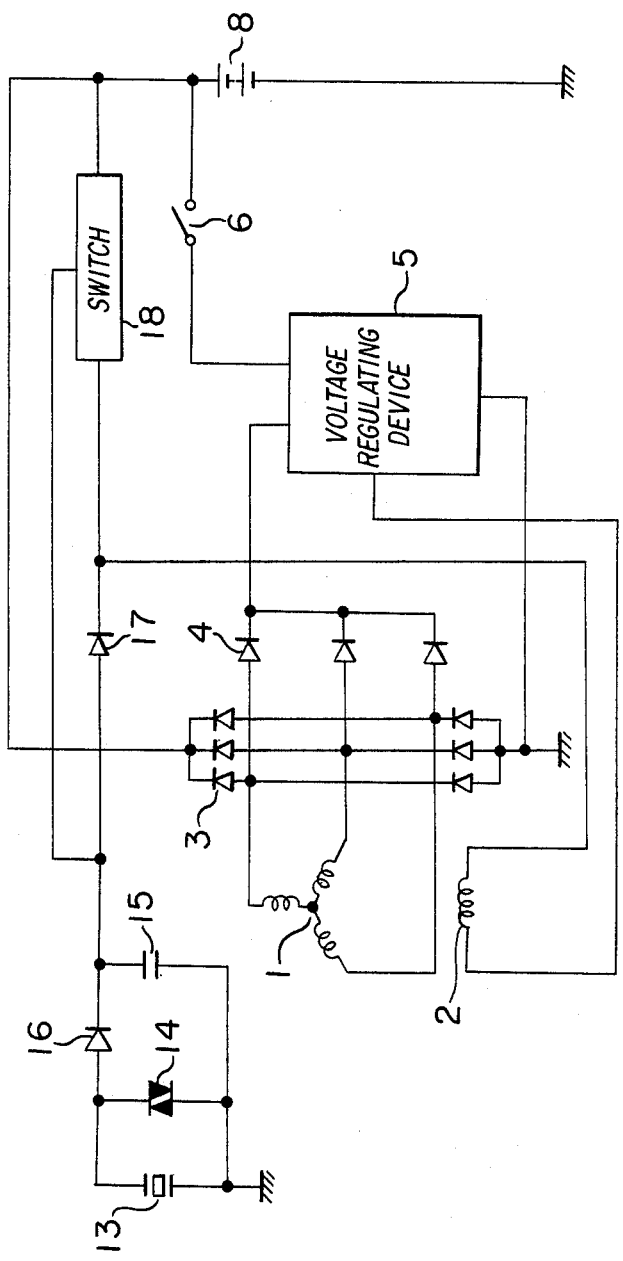
FIG. 5 is a circuit diagram of a still another embodiment of the alternating current generator of the present invention.

FIG. 5 shows still another embodiment of the present invention.

In FIG. 5, the reference numeral 13 designates a piezoelectric element for converting vibration at an engine into electricity and the piezoelectric element is constituted, for instance, by Rochelle salt, quartz and so on. 14 designates a surge absorbing element such as a varistor which is connected in parallel to the piezoelectric element 13 to control a voltage produced in the piezoelectric element to be at a predetermined value or lower; 15 designates a capacitor which stores and smooths electric energy produced in the piezoelectric element 13 to output it to the field coil 2 of the generator; 16 and 17 respectively designate reverse current blocking diodes and 18 designates a switch to detect the terminal voltage of the capacitor 15 to perform opening and closing operations.

One terminal of the piezoelectric element 13 whose other terminal is grounded is connected to the switch 18 through the diodes 16, 17 serially connected in the forward direction. The junction of the diode 17 and the switch 18 is connected to the voltage controlling device 5 through the field coil 2. The positive side of the battery 8 whose negative side is grounded is connected to the switch 18 and is also connected to the voltage controlling device 5 through the key-switch 6.

The operation of the embodiment shown in FIG. 5 will be described.

In case that the terminal voltage of the capacitor 15 is below a previously determined value, the switch 18 is closed whereby an exciting current is passed to the field coil 2 through the circuit of the positive terminal of battery 8—switch 18—field coil 2—voltage controlling device 5—negative terminal of battery 8. Accordingly, actuation of the engine starts generation of power.

Then, when a force is applied to the piezoelectric element 13 through the vibration of the engine, electromotive force is produced and electric current flows into the capacitor 15 through the diode 16 whereby the terminal voltage of the capacitor 15 increases. When the terminal voltage of the capacitor reaches the previously determined value, the switch 18 opens to feed the exciting current to the field coil 2 through the circuit of the capacitor 15—diode 17—field coil 2—voltage controlling device 5—capacitor 15. Under the condition described above, revolution of the engine causes the generator to start generation of power as a separately excited generator.

Thus, the exciting current is supplied through the piezoelectric element 13 and the capacitor 15 and accordingly, as shown in characteristic comparison diagram of FIG. 3 in which the abscissa denotes revolution (rpm) and the ordinate denotes output current A, the revolution at the time of starting generation of power in the characteristic curve (a) of the embodiment of the present invention is lowered by $No(=N_1-N_2)$rpm in comparison with the characteristic curve (b) of the conventional generator and the output current is increased for the exciting current IF.

In accordance with this embodiment, an exciting current for a field coil is supplied through a piezoelectric element which converts the vibration of an engine into electricity with the result that there is attainable a remarkable effect such that much output is obtained in comparison with the conventional generator having the same size, hence substantial reduction in size is achieved and efficiency of the generator is also imrpoved.

Figure 6:
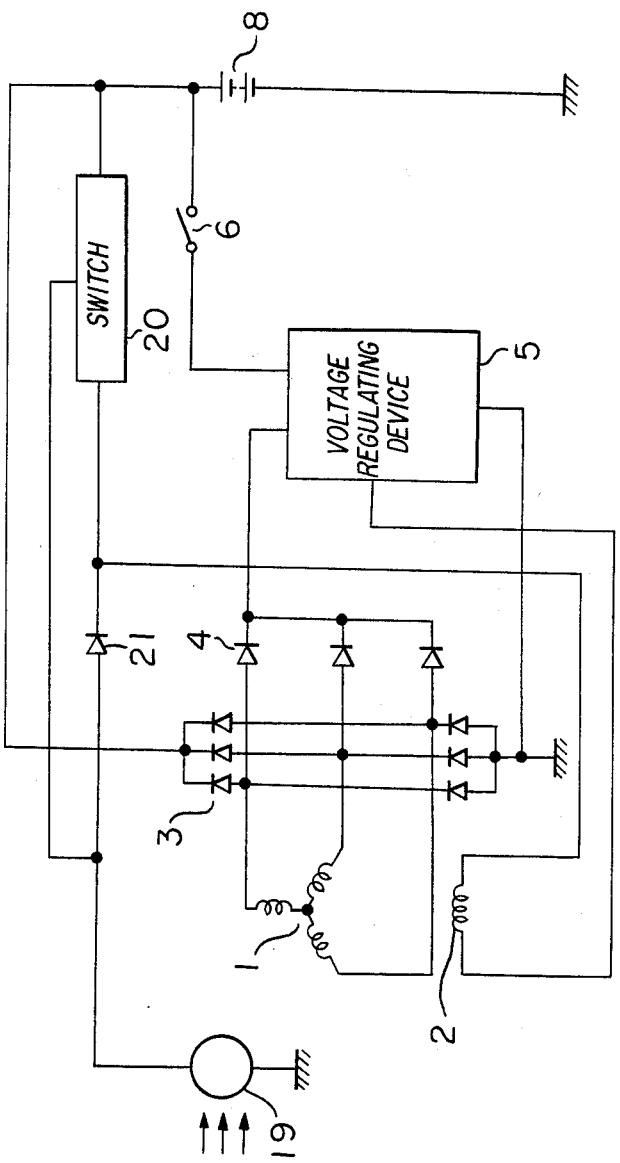
FIG. 6 is a circuit diagram of a separate embodiment of the alternating current generator of the present invention.

FIG. 6 is a separate embodiment of the present invention.

In FIG. 6, the reference numeral 19 designates a power source for separate excitation which performs thermoelectric conversion of heat of exhaust gas as waste heat of an engine or cooling water for the engine; 20 designates a switch to detect a voltage produced in the power source for separate excitation 19 so as to perform opening and closing operations; 21 designates a reverse current blocking diode connected in the forward direction between the power source for separate excitation 19 and the switch 20.

The junction of the switch 20 and the diode 21 is connected to the voltage controlling device 5 through the field coil 2. The positive side of the battery 8 whose negative side is grounded is connected to the switch 20 and is also connected to the voltage controlling device 5 through the key-switch 6.

The operation of the embodiment shown in FIG. 6 will be described.

At the initiation of operation of the engine, there is substantially no waste heat, hence voltage to be produced by the power source for separate excitation is zero. Accordingly, an exciting current is passed to the field coil 2 through the circuit of the positive terminal of battery 8—switch 20—field coil 2—voltage controlling device 5—negative terminal of battery 8 since the switch 20 is in closed state. Under the condition described above, as temperature of the waste heat of the engine becomes increasing, the power source for separate excitation 19 which in generally constituted by thermoelectric metals such as iron-Constantan, Chromel-Alumel and so on, being well known as a thermocouple or a thermoelectric semiconductor such as PbTe.Ge-Si alloy, produces a thermal electromotive force due to Seebeck effect. When the terminal voltage of the power source for separately excitation rises to reach a previously determined value, the switch 20 is opened. The opening of the switch 20 passes an exciting current to the field coil 2 through the circuit of the positive terminal of power source for separate excitation 19—diode 21—field coil 2—voltage controlling device 5—negative terminal of power source for separate excitation 19. Then, when the engine is driven, the generator starts generation of power as a separately excited generator.

Thus, the exciting current is supplied through the power source for separate excitation 19 and accordingly, as shown in characteristic comparison diagram of FIG. 3 in which the abscissa denotes revolution (rpm) and the ordinate denotes output current A, the revolution at the time of starting generation of power in the characteristic curve (a) of the embodiment of the present invention is lowered by $No(=N_1-N_2)$rpm in comparison with the characteristic curve (b) of the conventional generator and the output current is increased for the exciting current IF.

In this embodiment, description has been made as to use of the thermoelectric metals or the thermoelectric semiconductor as a thermoelectric converting element of the power source for separate excitation 19. The present invention is not limited to use of these elements but it is possible to use a thermionic generator utilizing phenomenon that thermoelectrons are emitted by heating metal beyond a certain temperature or Rochelle salt generating a thermal electromotive force based on pyroelectric effect to obtain the same effect as described in the above-mentioned embodiment.

In accordance with the embodiment of the present invention, an exciting current for a field coil is supplied from a power source for separate excitation which does not require any power of an engine and accordingly, there is attainable a remarkable effect such that much output current is obtained in comparison with the conventional generator having the same size, hence substantial reduction in size of the generator is achieved and efficiency of the generator is also improved.

INDUSTRIAL UTILITY

The present invention is applicable not only to an alternating current generator for a vehicle but also to a car such as a farm tractor, an industrial vehicle and so on.

We claim:

1. An alternating current system for a car, comprising:
   a field coil;
   an armature coil having a three-phase connection to generate an alternating current output;
   a rectifying device for rectifying the alternating current output;
   a battery to be charged with the output of said rectifying device;
   a voltage controlling device for turning on and off the field current passing to said field coil; and
   a power source separate from said battery and separate from said rectifying device for supplying said field current;
   wherein said field current is supplied separately from said rectified output, so as to produce an increased rectified output.

2. An alternating current system according to claim 1, wherein said power source is constituted by a solar battery.

3. An alternating current system for a car according to claim 1, wherein said power source is constituted by a piezoelectric element converting the vibration of an engine into electrical energy.

4. An alternating current system for a car according to claim 1, wherein said power source is constituted by a piezoelectric element for converting the vibration of an engine into electrical energy and a surge absorbing element and a capacitor which are respectively connected in parallel to said piezoelectric element.

5. An alternating current system for a car according to claim 4, wherein said piezoelectric element is formed by Rochelle salt and said surge absorbing element is a varistor.

6. An alternating current system for a car according to claim 1, wherein said power source is formed by a power source performing heat-electricity conversion of waste heat discharged from an engine.

7. An alternating current system for a car according to claim 6, wherein said power source performing heat-electricity conversion of the waste heat discharged from the engine is a thermocouple of iron-Constantan.

8. An alternating current system for a car according to claim 6, wherein said power source performing heat-electricity conversion of the waste heat discharged from the engine is formed by a thermoelectric semiconductor.

9. An alternating current system for a car, comprising:
   a field coil;
   an armature coil having a three-phase connection to generate an alternating current output;
   a rectifying device for rectifying the alternating current output;
   a battery to be charged with the output of said rectifying device;
   a voltage controlling device for turning on and off the field current passing to said field coil;
   a power source separate from said battery for supplying said field current; and
   a switch connected between said power source and said battery for comparing the voltage from said power source to a threshold value and supplying said field current from said battery when said voltage is below the threshold value and supplying said field current from said power source when said voltage is above said threshold value;
   wherein said field current is supplied separately from said rectified output when the voltage from said power source is sufficiently large, so as to produce an increased rectified output.

* * * * *